US005142934A

United States Patent [19]

Persson et al.

[11] Patent Number: 5,142,934

[45] Date of Patent: Sep. 1, 1992

[54] CHAIN SAW CONTROL

[75] Inventors: Magnus T. J. Persson, Huskvarna; Hans P. Lindblad, Alingsås; Kenneth R. Skogward, Huskvarna, all of Sweden

[73] Assignee: Aktiebolaget Electrolux, Stockholm, Sweden

[21] Appl. No.: 580,581

[22] Filed: Sep. 11, 1990

[30] Foreign Application Priority Data

Sep. 12, 1989 [SE] Sweden ............................... 8903001

[51] Int. Cl.[5] ........................ F16C 1/10; B23D 53/00; B23D 57/02

[52] U.S. Cl. .............................. 74/502.4; 74/501.5 R; 74/502.6; 74/471 R; 30/382; 30/381

[58] Field of Search ............ 74/501.5 R, 501.6, 502.2, 74/502, 471 R; 30/381-387

[56] References Cited

U.S. PATENT DOCUMENTS 4,028,804 6/1977 Hammond ............................ 30/382
4,302,880 12/1981 Elfving et al. ........................ 30/382
4,406,066 9/1983 Itzrodt ................................. 30/382
4,594,780 6/1986 Schliemann et al. ................. 30/382
4,753,012 6/1988 Schurr .................................. 30/382
4,875,384 10/1989 Hirayama et al. ................. 74/502.4
4,896,425 1/1990 Henriksson ........................... 30/381
4,898,039 2/1990 Aiyama et al. ..................... 74/502.4

*Primary Examiner*—Vinh T. Luong
*Attorney, Agent, or Firm*—Pearne, Gordon, McCoy & Granger

[57] ABSTRACT

A control device on a chain saw, for example, a gas control, consisting of a finger grip (12) and a lever (11) (snapped together) to which the cable and the sheath of a Bowden cable (10) are attached, respectively. The other end of the sheath is fastened to the base of a carburetor compartment. When the grip and the lever move upwards, the rear end (28) of the lever hits a fulcrum (20) in the handle. The grip can continue upwards due to a guide point between the lever and the grip and, thus, the wire is moved in relation to the sheath so that a gas lever (13) of the carburetor is tuned. The sheath, consisting of a spirally wound steel wire, is tightly wound, but has also a short length (31) being sparsely wound as a pressure spring and provides an overload protection preventing the cable from breaking.

9 Claims, 2 Drawing Sheets

CHAIN SAW CONTROL

BACKGROUND OF THE INVENTION

The present invention relates to a chain saw control with devibration members between an engine part and a handle part of the chain saw body.

Prior art arrangements, for turning, for example, a throttle have the shape of a lever and a Bowden cable or a system of links by which setting movements are transfered from a finger grip to the shaft of the throttle. Due to the fact that the engine is not rigidly connected to the handles but suspended in the devibration members it can make a relative movement to the handles when operating and carrying the saw. When making a direct connection between the throttle of the carburetor, and the finger grip control (gas control) by means of a link those members have the disadvantage of providing involuntary throttle settings when the handle carries out such a movement relative to the engine. In the U.S. Pat. No. 4,896,425 Swedish Patent Publication SE-458513) an arrangement is described where said disadvantage is eliminated by the fact that the gas control bearing is made in oblong holes and completed with a curve guide, both in the rear handle of the chain saw. When the handle is making a relative movement towards the engine the gas control can move a corresponding distance in the bearing without the throttle in the carburetor being influenced in its idle position. This previous arrangement is primarily intended for a connection in the form of a link between the carburetor and the gas control. An arrangement provided with a Bowden cable, where similar properties can be obtained, is presented in the present invention.

SUMMARY OF THE INVENTION

The problem of eliminating the disadvantage involuntary throttle settings is-according to the invention-meant to be solved by means of a gas control, provided with a lever, in which the gas wire is attached while the sheath of the wire is fastened in the gas control itself. The lever pulls the wire efficiently relative to the sheath even when the control makes a short movement. The unit is easy to install and fits into most of the saw models. It requires no adjustment screw on the sheath and is not influenced when the rear handle moves itself relative to the engine part. These advantages and others which will become apparent in the following description of a control according to the invention can be obtained when the unit is applied according to claim 1.

BRIEF DESCRIPTION OF THE DRAWINGS

An embodiment of a control device according to the invention is described in the following with reference to attached drawings in which.

DETAILED DESCRIPTION OF THE PREFERRED EMBODIMENT

Figure 1:
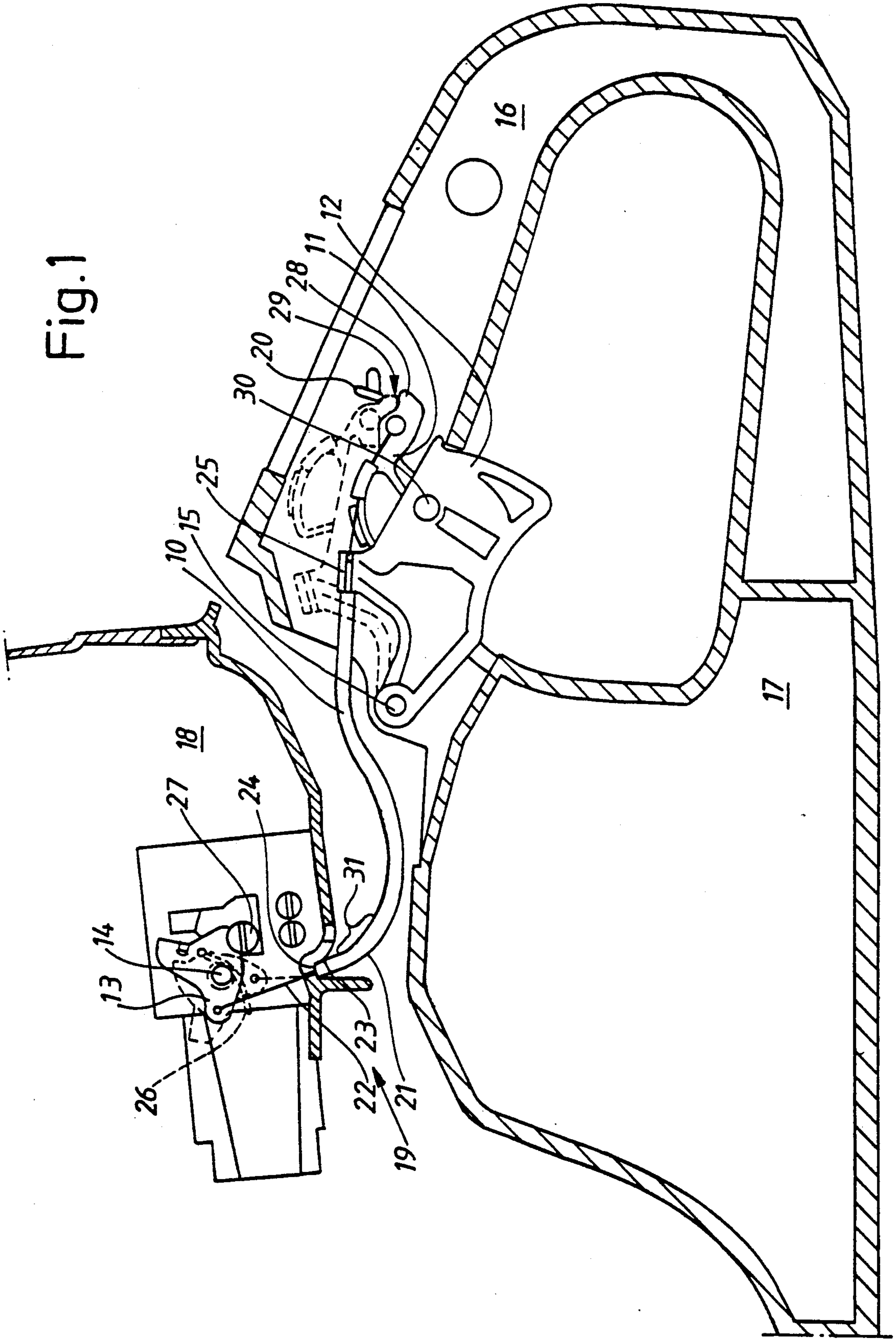
FIG. 1 shows a carburetor and a chain saw handle in vertical cross section with the control device illustrated in two positions, one in solid lines and one in dashed.

In the control device, a wire enclosed in a casing, such as a Bowden cable, 10 is used to transfer a pulling movement from a lever 11 on a gas control 12 to an arm 13 on a throttle shaft. The gas control is journalled on a shaft 15 in a rear handle 16 of a chain saw body, the rear end of which is schematically illustrated in the figure.

The handle is included in the handle part 17 of the saw body which is united to the engine part 18 by means of elastic elements. Between the two parts there is therefore a space 19 which allows the parts to move themselves relative to each other. In the control device there is also a stop lug 20 attached to the handle.

The Bowden cable has as usual a sheath 21 of spirally wound steel thread and a steel wire 22 in it. One end of the wire is fastened to the arm 13 and the other one to the lever 11. One end of the sheath has a stopper 23 against a cable passage 24 in the wall of the saw body and the other one a fastening 25 to the gas control. The details in solid black on the drawings show the gas control in an idle or resting position. In that position a protruding cam 28 on the lever 11 has a short distance 29 to the stop lug 20. The throttle shaft 14 is influenced by a return spring 26 that holds the arm 13 against an idle screw 27 by which the idling R.P.M. is set.

When setting input, the operator pushes his forefinger against the gas control which then rotates into the handle with the shaft 15 as a pivot. The gas control moves to the position shown by the dashed lines in FIG. 1. The lever 11 is fastened to a guide point 30 between the gas control and the lever. The cam of the lever hits against the stop lug 30 when movir upwards. The lever has during the movement turned around the point 30 and in that connection, pulled the wire a bit out of the sheath which remains in its fastening 25. The movement of the wire has influenced the arm 13 to its dashed position that involves maximum gas to the engine. When the operator releases the gas control, the arm 13 is returned to the original position by means of the return spring and the wire is pulled back.

The Bowden cable normally has a tightly wound wire spiral as a sheath which encloses the cable, along almost its entire length. Close to the stopper 23 the cable is, however, sparsely wound on several centimeters of length (31). The reason is to make that length of the cable act as an overload protection during maximum gas input since the sheath is then somewhat compressed and provides a softer stop to the gas control movement. This protects the cable and the arms from being torn off.

The fastening of the Bowden cable to the two positions 11, 12 ensures that only relative movement between the wire and the sheath is transfered at a gas input setting to the engine part. The relative movement originating from moving the handle towards the engine part makes no change of the gas position as an eventual tension in the sheath 21 will turn both portions 11, 12 a short distance 29 without any relative movement between them.

Figure 2:
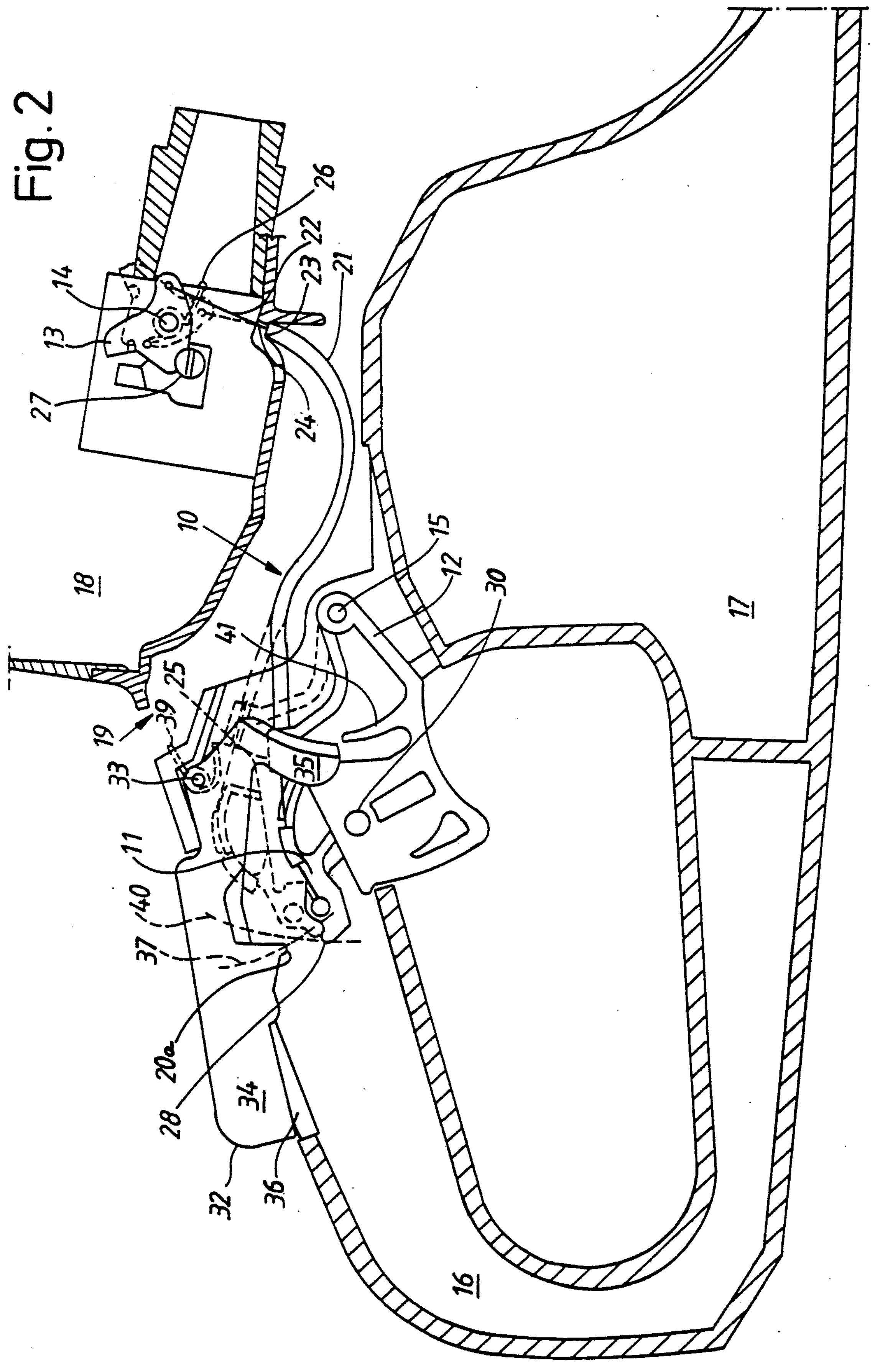
FIG. 2 shows a variation of the control device.

The control in FIG. 2 is different from that in FIG. 1 as far as one point is concerned. In order that the arrangement shall function in the intended way a stop lug 20 is required for a cam 28 protruding on the lever 11. This stop lug is in FIG. 2 situated on a movable intermediary hand control 32 journalled on a shaft 33 in the handle. In this way the control has the shape of a joint lever with two arms 34, 35. When the arm 34 is pushed down in a slot 36 in the handle by the hand of the operator the stop lug follows a dashed curve 37 to a position just above the cam 28. In that position the arrangement is ready for a gas adjustment.

When setting gas input the operator pushes his forefinger against the gas control which is then turned into the handle with the shaft 15 as a pivot. The gas control moves to the position shown by the dashed lines in FIG. 2. The lever 11 is fastened to the guide point 38 between the gas control and the lever. The cam of the lever hits against the stop lug 20 when moving upwards. The lever has, during the movement, turned around the point 38 and, in that connection, pulled the wire a bit out of the sheath which remains in its fastening 25. As soon as the operator releases the grip 16, the handle of the intermediary hand control 32 returns to the position shown by means of a return spring 39.

When the control member 32 is in the shown uninfluenced position, the cam 28 of the lever can pass the stop lug 20, according to a dashed curve 40 which has the result that the lever does not, in such a case, rotate in its bearing on the gas control. When the gas control 12 is actuated there will not be any setting or increase of the gas input as the wire and the sheath remain in their mutual positions. If the gas control 12 would in this way be pushed in prior to the control member 32 the arrangement thus forms a protection against uncontrolled setting that might cause accidents. Moreover, by the arm 35, mentioned before, the control member 32 is prevented from being pressed in after a starting attempt with the gas control, as that arm is in the illustrated position parallel to a rib 41 on the gas control which in the depressed position (dashed) prevents, by means of that rib, turning of the arm and the control device from the position shown. Thus it is not possible to control the gas by means of the intermediary hand control 32. In order that the shown (solid) position shall be obtained the operator must release the gas control and if a gas setting is wanted, the operator should first depress the intermediary hand control and then the gas control.

The described embodiment should be regarded as an example how to realize the invention. Members can of course be moved, completed, replaced or made different without deviating from the scope the invention.

We claim:

1. In a chainsaw with an engine part (18) and a rear handle (16), a control, comprising:

a cable (22) enclosed in a sheath (21) for at least part of a length of the cable;

a finger grip (12) journalled on a handle shaft (15) in the rear handle and fastened to one end (25) of the sheath;

a lever journalled on the finger grip at a guide point (30) separate from the handle shaft and fastened to one end of the cable; and a fulcrum (20) in the rear handle located such that when the finger grip rotates, the fulcrum causes the lever to rotate thereby moving the cable relative to the sheath.

2. A control according to claim 1, wherein the fulcrum (20) is close (29) to the lever in the rest position (solid lines).

3. A control according to claim 2, further comprising a return spring (26) which influences the finger grip and the lever toward the rest position.

4. A control according to claim 2, wherein the engine part and the handle part are assembled close (19) to each other with a possible relative movement between them which corresponds to part of the distance (29) of the lever from the rest position to the fulcrum (20).

5. A control according to claim 1, wherein a part of a length of the sheath consists of a sparsely wound steel wire spiral whereas the remaining length is provided with a tightly wound spiral.

6. A control according to claim 1, further comprising an intermediary hand control including a first hand control arm recessable in the handle which arm is provided with a fulcrum (20*a*) what, in the recessed position of the arm, in cooperation with the lever, forms the fulcrum of the lever when the finger grip is activated, but, in the uninfluenced position, avoids such a co-operation to turning the lever during activation of the finger grip.

7. A control according to claim 6, further comprising a rib on the finger grip co-operating with a second hand control arm, which arm forms part of a joint lever, and which rib forms, in the influenced position, a locking device for said second hand control arm in its uninfluenced position and prevents movement of the intermediary hand control.

8. A control according to claim 6, wherein the intermediary hand control is journalled on a shaft in the handle and that the fulcrum can move along curve between the influenced and the uninfluenced position and said fulcrum of the lever takes place on that curve somewhat into the moving path of the finger grip.

9. A control according to claim 1, further comprising a chainsaw having a throttle connected to and controlled by the cable.

* * * * *